US010079519B2

(12) United States Patent
Hamagishi et al.

(10) Patent No.: US 10,079,519 B2
(45) Date of Patent: Sep. 18, 2018

(54) MOTOR

(71) Applicant: NIDEC CORPORATION, Minami-ku, Kyoto (JP)

(72) Inventors: Kenichiro Hamagishi, Kyoto (JP); Hironori Kizaki, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 235 days.

(21) Appl. No.: 15/210,340

(22) Filed: Jul. 14, 2016

(65) Prior Publication Data

US 2017/0025916 A1    Jan. 26, 2017

(30) Foreign Application Priority Data

Jul. 21, 2015  (JP) ................. 2015-144066

(51) Int. Cl.
| | |
|---|---|
| *H02K 5/14* | (2006.01) |
| *H02K 5/173* | (2006.01) |
| *H02K 5/22* | (2006.01) |

(52) U.S. Cl.
CPC .......... *H02K 5/148* (2013.01); *H02K 5/1732* (2013.01); *H02K 5/225* (2013.01)

(58) Field of Classification Search
CPC .. H02K 5/14; H02K 5/16; H02K 5/22; H02K 5/148; H02K 5/1732; H02K 5/225
USPC ........................... 310/91, 400, 401, 424, 425
See application file for complete search history.

(56) References Cited

U.S. PATENT DOCUMENTS

| | | | |
|---|---|---|---|
| 8,344,579 B2 * | 1/2013 | Nagy ................ | H02K 1/30 |
| | | | 310/216.053 |
| 2006/0239838 A1 * | 10/2006 | Rahbar ............... | F04D 25/0606 |
| | | | 417/354 |

FOREIGN PATENT DOCUMENTS

| | | |
|---|---|---|
| CN | 202111552 U | 1/2012 |
| CN | 204465289 U | 7/2015 |
| EP | 2830196 A1 | 1/2015 |
| JP | H03285544 A | 12/1991 |
| JP | 2014039381 A | 2/2014 |
| JP | 2014110697 A | 6/2014 |

* cited by examiner

*Primary Examiner* — Naishadh Desai
(74) *Attorney, Agent, or Firm* — Cantor Colburn LLP

(57) ABSTRACT

A motor may include a shaft, an armature, a commutator, a bearing, a housing, a bracket, and a brush card assembly. The brush card assembly may include a brush contacting the commutator, and a brush card holding the brush. The bracket may include a bracket bottom portion covering at least a portion of a lower side of the brush card, a cylindrical bracket cylindrical portion extending upwardly from a radially outer edge of the bracket bottom portion, a bearing holding portion extending upwardly from the bracket bottom portion at a radially inner side of the bracket cylindrical portion, and holding the bearing, and a rib positioned above the bracket bottom portion, and extending radially outward from the bearing holding portion.

12 Claims, 6 Drawing Sheets

US 10,079,519 B2

MOTOR

CROSS REFERENCE TO RELATED APPLICATION

The present invention claims priority under 35 U.S.C. § 119 to Japanese Application No. 2015-144066 filed on Jul. 21, 2015 the entire content of which is incorporated herein by reference.

FIELD OF THE INVENTION

The present disclosure relates to a motor.

BACKGROUND

Among typical types of electric motor, there is a motor which includes a commutator having a plurality of segments, and a brush. The brush is brought into sliding contact with each segment of the commutator.

It is necessary for the electric motor as described above to reduce a dimension of a bracket in a height direction for achieving a reduction in size or weight of the electric motor. In order to reduce the dimension of the bracket in the height direction, for example, there is a method of reducing the thickness of the bracket. However, if the thickness of the bracket is reduced, the stiffness of the bracket is lowered. Consequently, there is a possibility that a bearing held by the bracket vibrates due to vibrations of the electric motor. The vibrating bearing causes the runout of a rotational shaft, so that the commutator fixed to the rotational shaft wobbles. As a result, the commutator is separated from the brush in some cases, which results in unstable conduction between the commutator and the brush. Thus, there arises a problem in that sparking occurs between the commutator and the brush. For this reason, there arises a problem in that the lifetime of the electric motor becomes short.

SUMMARY

A motor according to an embodiment of the present disclosure including a shaft extending in a direction parallel with a center axis extending in a vertical direction. The motor includes: an armature fixed to the shaft; a commutator fixed to the shaft and electrically connected to the armature; a bearing supporting the shaft; a cylindrical housing being open toward a lower side and accommodating the armature; a cylindrical bracket arranged under the housing and fixed to the housing; and a brush card assembly arranged between the housing and the bracket in an axial direction. The brush card assembly includes a brush contacting the commutator, and a brush card holding the brush. The bracket includes a bracket bottom portion covering at least a portion of a lower side of the brush card, a cylindrical bracket cylindrical portion extending upwardly from a radially outer edge of the bracket bottom portion, a bearing holding portion extending upwardly from the bracket bottom portion at a radially inner side of the bracket cylindrical portion, and holding the bearing, and a rib arranged above the bracket bottom portion, and extending radially outward from the bearing holding portion.

The above and other elements, features, steps, characteristics and advantages will become more apparent from the following detailed description of the embodiments with reference to the attached drawings.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, a motor according to an embodiment of the present disclosure will be described with reference to the accompanying drawings.

Figure 1:
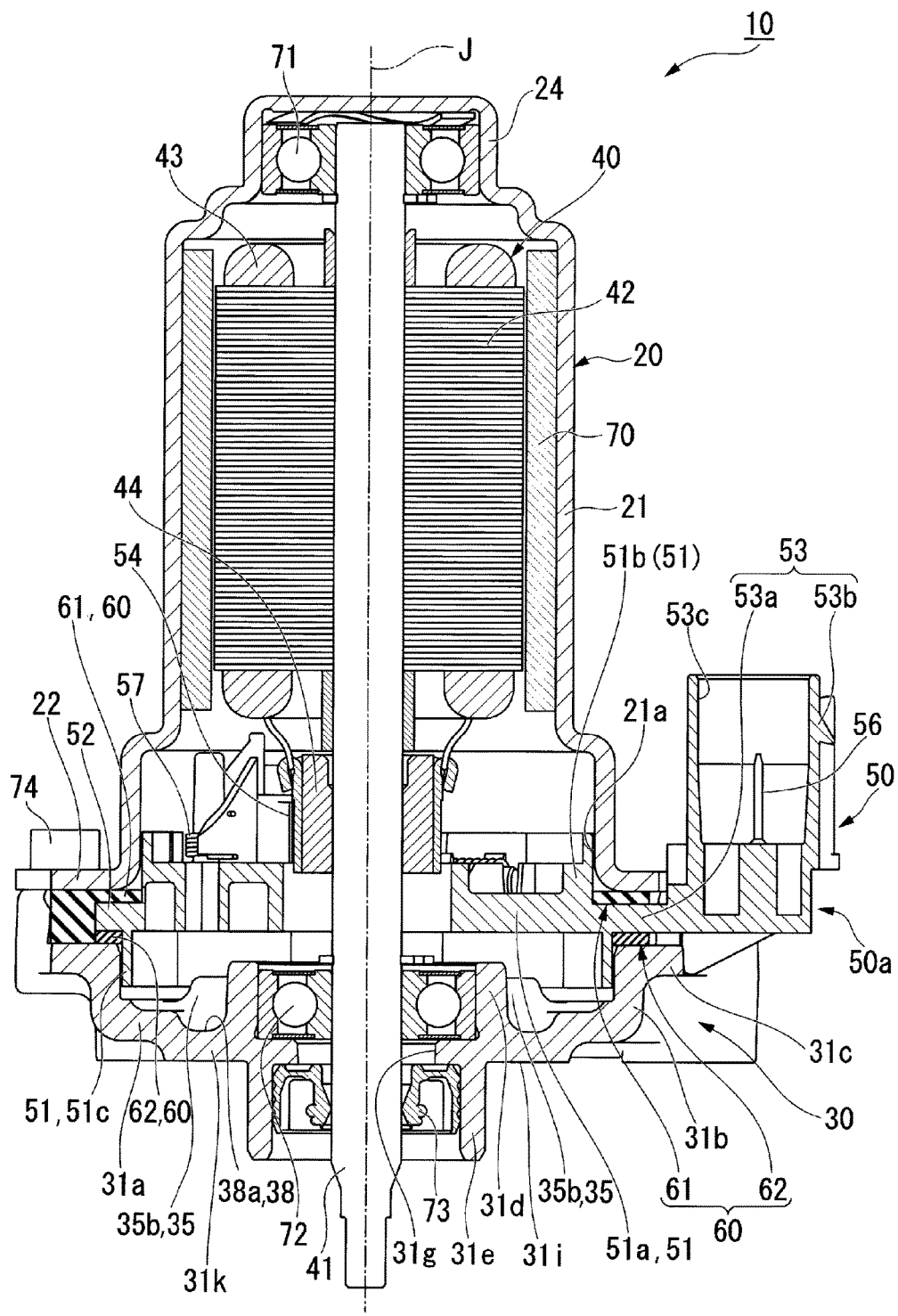
FIG. 1 is a cross-sectional view showing a motor according to an embodiment.

In the following description, it is assumed herein that a vertical direction is defined as a direction in which a central axis of a motor extends, and that an upper side and a lower side along the central axis in FIG. 1 are referred to simply as "an upper side" and "a lower side", respectively. It should be noted, however, that the above definitions of the vertical direction and the upper and lower sides are not meant to indicate relative positions or directions of different members or portions when those members or portions are actually installed in a device. Also note that a direction parallel with the center axis J is referred to by the term as 'axial direction', "axial", or "axially", that radial direction having its center on the center axis J is simply referred to by the term as 'radial direction', "radial", or "radially", and that a circumferential direction having its center on the center axis J is simply referred to by the term as 'circumferential direction', "circumferential", or "circumferentially".

It is assumed that the wording "to extend in an axial direction", "to extend axially", or the like as used in the following description includes not only to extend exactly in the axial direction but also to extend in a direction at an angle of less than 45 degrees to the axial direction. It is assumed that the wording "to extend in a radial direction", "to extend radially", or the like as used in the following description includes not only to extend exactly in a radial direction or exactly radially, that is, exactly in a direction or directions perpendicular to the axial direction, but also to extend in a direction or directions at an angle of less than 45 degrees to the radial direction(s).

Figure 2:
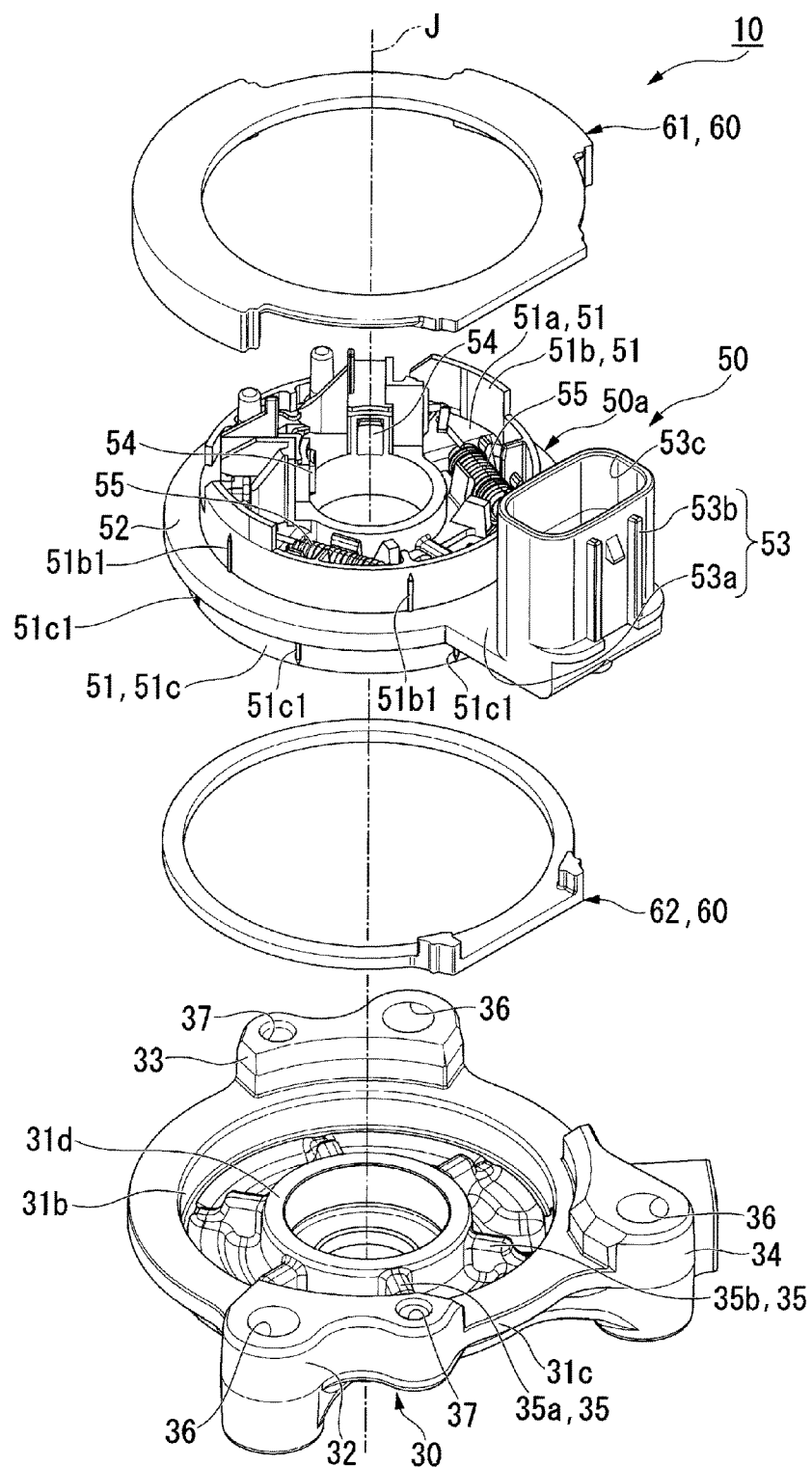
FIG. 2 is an exploded perspective view showing the motor according to the embodiment.

FIG. 1 is a cross-sectional view of a motor 10 according to an embodiment. FIG. 2 is an exploded perspective view of the motor 10 according to the embodiment. FIG. 2 does not illustrate a housing 20, an armature 40, and the like.

As shown in FIGS. 1 and 2, the motor 10 includes a shaft 41, the armature 40, a commutator 44, at least one bearing, a magnet 70, an oil seal 73, the housing 20, a bracket 30, a brush card assembly 50, and a seal member 60. In the embodiment, the bearing includes an upper bearing 71 and a lower bearing 72.

As shown in FIG. 1, the shaft 41 extends in a direction parallel with the vertically extending center axis J. The shaft 41 is supported by the upper bearing 71 and the lower bearing 72 so as to rotate around the center axis J. A lower end of the shaft 41 is exposed outside the bracket 30 through an output shaft hole 31g which will be described in detail below.

The armature 40 is fixed to the shaft 41. The armature 40 rotates around the center axis J, together with the shaft 41. The armature 40 has a core 42 and a plurality of coils 43. The core 42 includes a plurality of electromagnetic steel sheets stacked axially. The core 42 has a through hole axially passing there through. At least a portion of the shaft 41 is penetrated through the through hole in the core 42. An inner side surface of the core 42 and an outer side surface of the shaft 41 are fixed by, for example, press fitting or bonding to each other. The core 42 includes an almost circular-shaped core back portion (not shown) and a plurality of tooth portions (not shown) extending radially inward from the core back portion. The each coil 43 is defined by winding a lead wire and is disposed on the respective tooth portions.

The commutator 44 is arranged under the armature 40 and is fixed to the shaft 41. The commutator 44 is electrically connected to the coils 43. In other words, the commutator 44 is electrically connected to the armature 40. Preferably, at least a portion of the commutator 44 contacts a brush 54 described in detail below. Each of the coils 43 is supplied with a current from the commutator 44 through the brush 54. With this configuration, the armature 40 is excited.

The shaft 41 is supported by the upper and lower bearings 71 and 72 to be rotatable about the central axis J. The upper bearing 71 is arranged above the armature 40. The upper bearing 71 is held by an upper bearing holding portion 24 described in details below. The lower bearing 72 is arranged below the commutator 44. The lower bearing 72 is held by a lower bearing holding portion 31d described in detail below.

In the embodiment, the magnet 70 has an annular or substantially annular shape. The magnet 70 is fixed to an inner circumferential surface of the cylindrical housing 20. The magnet 70 is arranged radially opposite to the armature 40. An N pole and an S pole which are magnetic poles of the magnet 70 are alternately arranged in the circumferential direction. The magnet 70 may be a single member or may include a plurality of magnets. If the magnet 70 includes a plurality of magnets, preferably, each magnet is disposed on the inner side surface of the housing 20 in the circumferential direction.

The oil seal 73 is held by an oil seal holding portion 31e described in detail below. The oil seal 73 serves to prevent oil outside the motor 10 from being infiltrated into the motor 10 through the lower bearing 72.

The housing 20 has a cylindrical or substantially cylindrical shape with a cap while having an opening being open toward a lower side. The housing 20 accommodates the armature 40 inside. In the embodiment, the housing 20 has a cylindrical or substantially cylindrical shape. Preferably, the housing 20 is made of a metal (e.g., an iron material such as SUU). More preferably, the housing 20 is made of a magnetic material or the like. If the material for the housing 20 is a magnetic material, the housing 20 serves as a yoke of the magnet 70.

The housing 20 has a housing cylindrical portion 21 and a housing flange portion 22. The housing cylindrical portion 21 has a cylindrical or substantially cylindrical shape with a cap. The housing cylindrical portion 21 has a lower opening portion 21a which is open at the lower portion thereof. That is, the housing 20 is open at the lower portion thereof. The housing cylindrical portion 21 has the upper bearing holding portion 24 at an upper end thereof. The upper bearing 71 is arranged on a radially inner side of the upper bearing holding portion 24. The upper bearing holding portion 24 holds the upper bearing 71.

An outer diameter of the housing cylindrical portion 21 is increased stepwise in an order of the upper bearing holding portion 24, a cylindrical shape part of the lower portion of the upper bearing holding portion 24, and the lower opening portion 21a. That is, an outer diameter of the upper bearing holding portion 24 is smaller than an outer diameter of the cylindrical shape part of the lower portion of the upper bearing holding portion 24. The outer diameter of the cylindrical shape part of the lower portion of the upper bearing holding portion 24 is smaller than an outer diameter of the lower opening portion 21a. The housing cylindrical portion 21 has a stepwise outer shape such that a plurality of step portions are provided toward the axially upper side.

The housing flange portion 22 extends radially outward from the lower opening portion 21a. Although not shown in the drawings, the housing flange portion 22 has a mounting hole portion and a fixed hole portion. The mounting hole portion is a hole axially passing through the housing flange portion 22. The mounting hole portion has, for example, a screw penetrated there through to mount the motor 10 on, for example, a vehicle body. The fixed hole portion axially passes through the housing flange portion 22. The housing 20 is fixed to the bracket 30 in such a manner that, for example, a screw is penetrated through the fixed hole portion.

The bracket 30 has a cylindrical or substantially cylindrical shape. The bracket 30 is arranged below the housing 20. The bracket 30 is fixed to the housing 20. Preferably, the bracket 30 is made of a metal (e.g., aluminum or an aluminum alloy).

Figure 3:
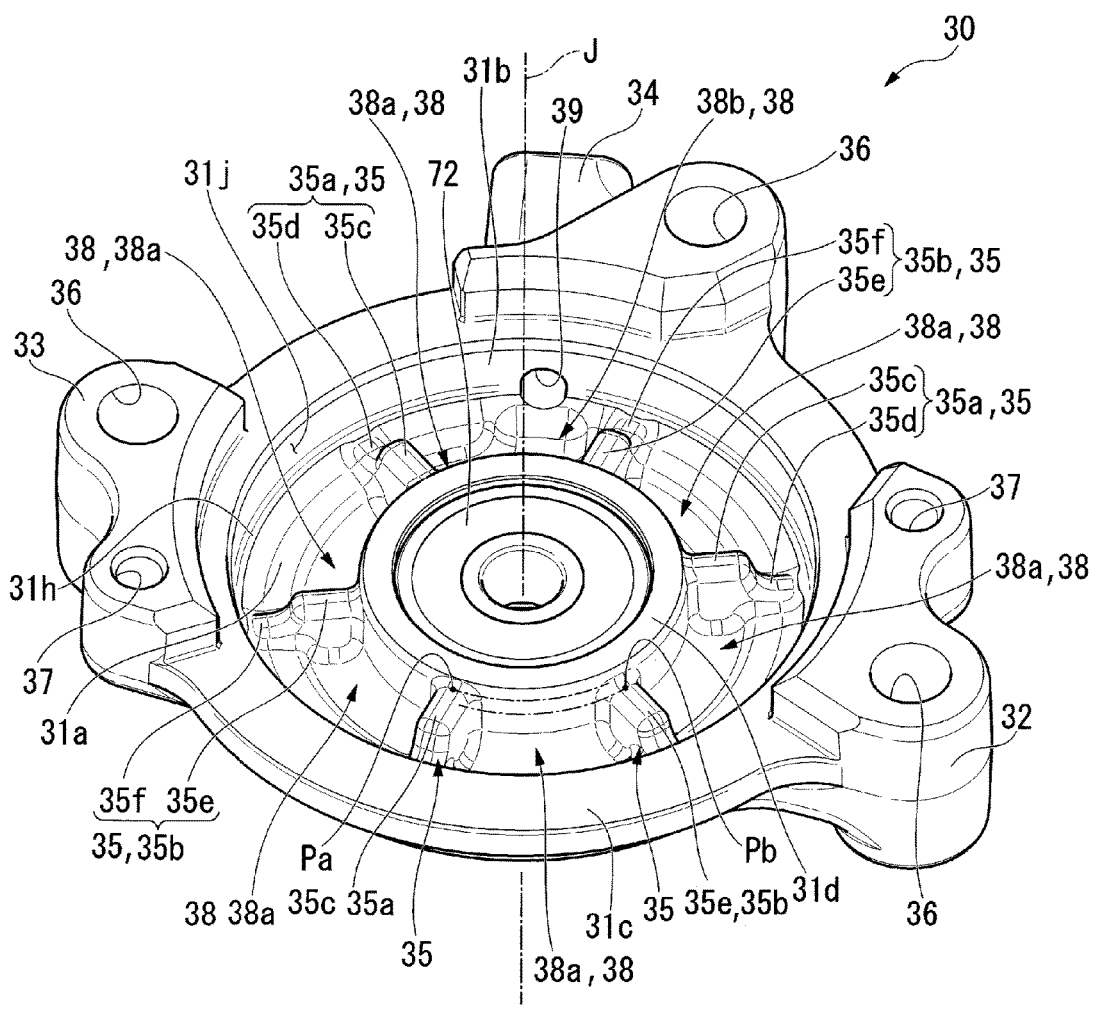
FIG. 3 is a perspective view showing a bracket according to the embodiment.
Figure 4:
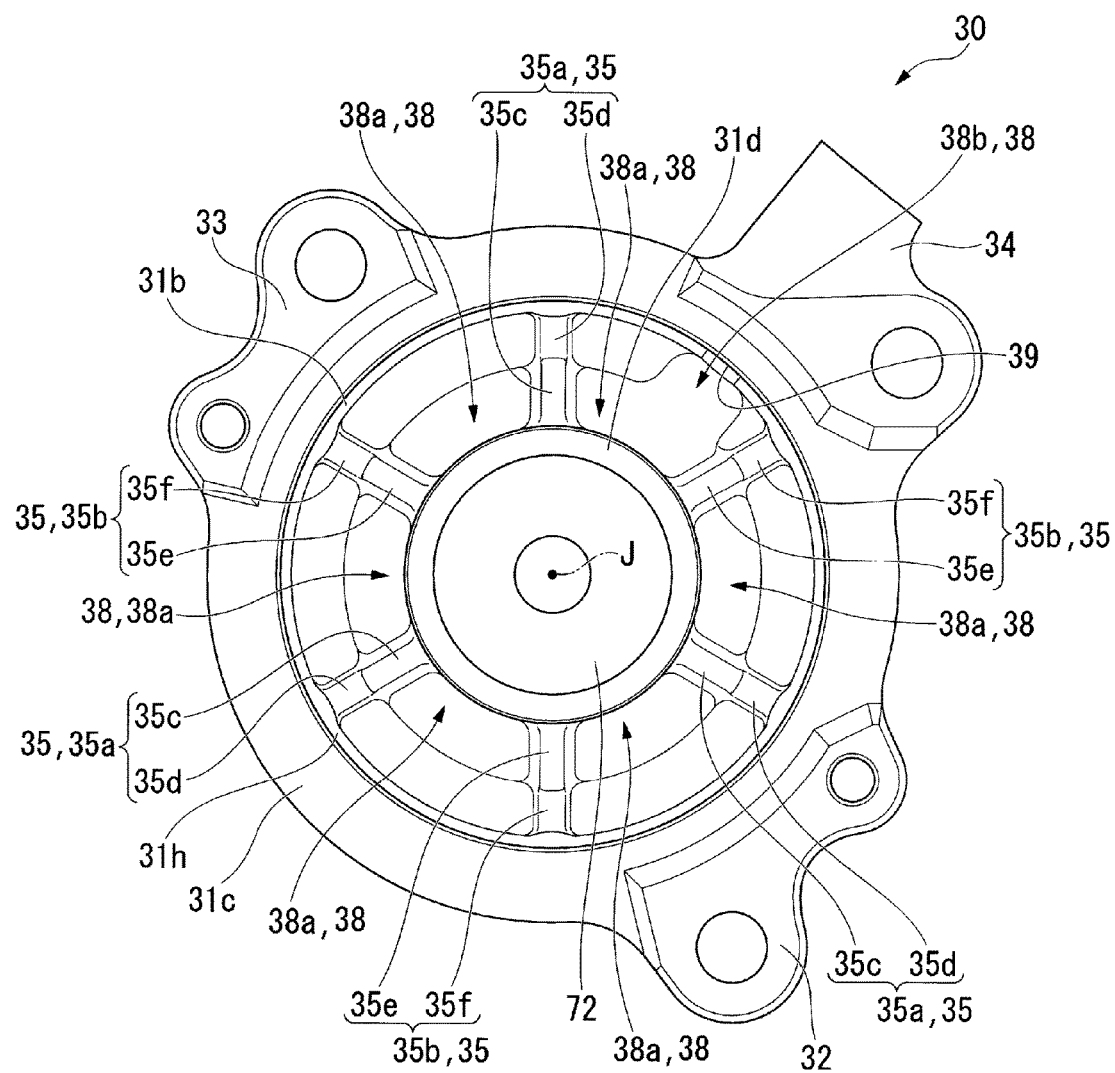
FIG. 4 is a plan view showing the bracket according to the embodiment.
Figure 5:
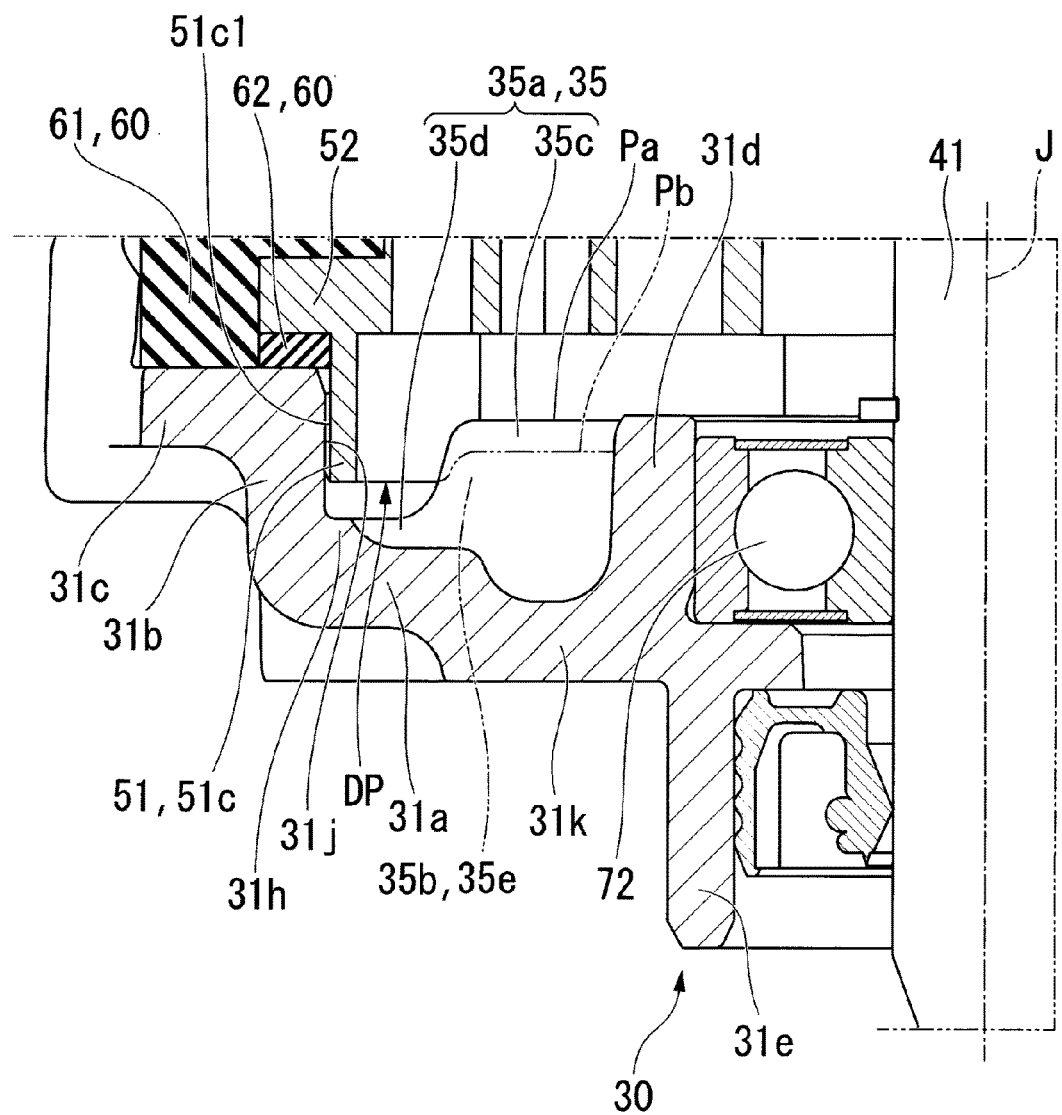
FIG. 5 is a cross-sectional view showing a portion of the motor according to the embodiment.

FIG. 3 is a perspective view of the bracket 30. FIG. 4 is a plan view of the bracket 30. FIG. 5 is a cross-sectional view showing a portion of the motor 10. In FIG. 5, a chain double-dashed line indicates a second rib 35b overlapping with a first rib 35a.

As shown in FIGS. 1, 2, and 3, the bracket 30 has a bracket bottom portion 31a, a mounting portion 31k, a bracket cylindrical portion 31b, a bracket flange portion 31c, the lower bearing holding portion 31d, the oil seal holding portion 31e, a plurality of ribs 35, and fixing wall portions 32, 33, 34.

The bracket bottom portion 31a is a plate or substantially plate shape portion expanded in the radial direction. The bracket bottom portion 31a covers a lower portion of a brush card cylindrical portion 51 described in detail below. In other words, the bracket bottom portion 31a covers at least a portion of a lower portion of a brush card 50a. The bracket bottom portion 31a has the output shaft hole 31g penetrating through the center of the bracket bottom portion 31a in the axial direction. The shaft 41 is penetrated through the output shaft hole 31g.

As shown in FIG. 1, the bracket bottom portion 31a has a plurality of recess portions 38. As shown in FIG. 4, the recess portions 38 include first recess portions 38a and a second recess portion 38b. The mounting portion 31k protrudes downwardly from the lower surface of the bracket bottom portion 31a. The recess portions 38 are arranged on the upper surface of the bracket bottom portion 31a and are recessed downwardly.

In the embodiment, the lower surface of the mounting portion 31k (hereinafter, referred to as the mounting portion lower surface 31i) has a annular shape in plan view. Preferably, the mounting portion lower surface 31i is parallel with a horizontal surface. Although not shown in the drawings, the mounting portion 31k circumferentially surrounds the oil seal holding portion 31e in plan view. When the motor 10 is mounted on another apparatus, a surface of the apparatus is contact with the mounting portion lower surface 31*i*. The mounting portion lower surface 31*i* is formed by, for example, cutting or the like. The bracket 30 is molded by, for example, die casting or the like, and then is subjected to cutting or the like, so that the mounting portion lower surface 31*i* can be formed on the bracket 30.

Since the mounting portion lower surface 31*i* can be formed as described above, the flatness and the like of the mounting portion lower surface 31*i* can be further enhanced. As a result, the motor 10 can be mounted on another apparatus via the mounting portion lower surface 31*i* with high positional accuracy.

As shown in FIG. 4, the first recess portions 38*a* are arranged in the circumferential direction on the upper surface of the bracket bottom portion 31*a*. An inner side surface of each first recess portion 38*a* extends in the circumferential direction. In the embodiment, each of the first recess portions 38*a* has a circular or substantially circular outer shape in plan view. Each of the first recess portions 38*a* is arranged on a radially outer side of the lower bearing holding portion 31*d*. Each of the first recess portions 38*a* is adjacent to the lower bearing holding portion 31*d*.

The ribs 35 are arranged on the upper surface of the bracket bottom portion 31*a*. The ribs 35 are spaced apart from each other at an interval in the circumferential direction. More preferably, the ribs 35 are spaced apart from each other at an equal interval in the circumferential direction. Each of the ribs 35 extends radially outward from the lower bearing holding portion 31*d*. Each of the first recess portions 38*a* is arranged between the ribs 35 in the circumferential direction. With this configuration, even if the bracket bottom portion 31*a* is downsized in the axial direction in such a manner that the first recess portions 38*a* are arranged on the bracket bottom portion 31*a*, the ribs 35 can keep the strength of the bracket 30. That is, the ribs 35 can keep the strength of the thin bracket 30 at a certain level.

The inner surface of each first recess portion 38*a* extends from an end of each rib 35 on one side in the circumferential direction to an end of each rib 35 on the other side in the circumferential direction. At least a portion of the inner side surface of each first recess portion 38*a* connects between the ribs 35 in the circumferential direction.

In the embodiment, each of the first recess portions 38*a* is arranged between the ribs 35, which are adjacent to each other in the circumferential direction. However, each of the first recess portions 38*a* is not necessarily arranged on a space between the adjacent ribs 35. More specifically, the space defined between the ribs 35 which are adjacent to each other in the circumferential direction may include a space where a first recess portion 38*a* is arranged and a space where a first recess portion 38*a* is not arranged. In this case, the first recess portions 38*a* may be spaced apart from each other at an equal interval or an unequal interval. In the embodiment, the number of ribs 35 is six. The number of first recess portions 38*a* is also six. However, the number of ribs 35 is not limited to six, may be any of one to five or not less than seven, and is not particularly limited. The number of first recess portions 38*a* may be one, from two to five (inclusive), or not less than seven. That is, at least one rib 35 is arranged on the upper surface of the bracket bottom portion 31*a*. At least one first recess portion 38*a* is arranged between the ribs 35 in the circumferential direction.

An inner surface of the second recess portion 38*b* extends radially outward from the inner side surface of the first recess portion 38*a*. A radially outer end of the inner side surface of the second recess portion 38*b* is connected to the bracket cylindrical portion 31*b*. The second recess portion 38*b* is arranged between the adjacent ribs 35 in the circumferential direction. In the embodiment, one second recess portion 38*b* is arranged between the adjacent ribs 35 in the circumferential direction. However, the number of second recess portions 38*b* is not limited to one. A second recess portion 38*b* may be provided for each space between the adjacent ribs 35 in the circumferential direction; however, some of the spaces where no second recess portion 38*b* is provided may be allowed. If second recess portions 38*b* are arranged on the spaces, each of which is defined between the ribs 35 in the circumferential direction, the second recess portions 38*b* may be spaced apart from each other at an equal interval or an unequal interval.

As shown in FIG. 1, at least a portion of each recess portion 38 axially overlaps with the mounting portion 31*k*. This prevents a blowhole from being formed in the bracket 30 in manufacturing the bracket 30 by, for example, casting or the like. Moreover, the thickness of the bracket bottom portion 31*a* can be made even. Therefore, the bracket 30 can be molded with high accuracy in manufacturing the bracket 30 by casting, injection molding or the like.

Each of the first recess portions 38*a* axially overlaps with the mounting portion 31*k*. The entire inner side surface of each first recess portion 38*a* axially overlaps with the mounting portion 31*k*. The second recess portion 38*b* is arranged on a radially outer side than the mounting portion 31*k*. In other words, the second recess portion 38*b* does not axially overlap with the mounting portion 31*k*.

The bracket cylindrical portion 31*b* extends upwardly from a radially outer edge of the bracket bottom portion 31*a*. As shown in FIG. 3, the bracket cylindrical portion 31*b* has a cylindrical or substantially cylindrical shape. In the embodiment, the bracket cylindrical portion 31*b* has a cylindrical or substantially cylindrical shape having its center on the center axis J. The bracket cylindrical portion 31*b* has a bracket inner side surface 31*j*. Preferably, the bracket inner side surface 31*j* is formed in such a manner that the bracket 30 is subjected to cutting. Preferably, the bracket inner side surface 31*j* extends around in the circumferential direction.

As shown in FIG. 5, the bracket cylindrical portion 31*b* has a step portion 31*h* extending radially inward from the bracket inner side surface 31*j*. The step portion 31*h* is arranged on a lower end of the bracket cylindrical portion 31*b*. Preferably, the step portion 31*h* has an annular shape extending in the circumferential direction.

The inner side surface of the bracket cylindrical portion 31*b* includes the bracket inner side surface 31*j* and a radially inward surface of the step portion 31*h*. The bracket inner side surface 31*j* is arranged above the step portion 31*h*.

As shown in FIG. 3, the bracket cylindrical portion 31*b* has a hole portion 39 radially passing through a side surface of the bracket cylindrical portion 31*b*. Although not shown in the drawings, the hole portion 39 has an opening which is open at the bracket inner side surface 31*j* and an opening which is open at an outer side surface of the bracket cylindrical portion 31*b*. The hole portion 39 connects between the inside and outside of the bracket 30. In assembling the motor 10, therefore, the hole portion 39 prevents a negative pressure from being caused inside the bracket 30.

The openings of the hole portion 39 are positioned inside the second recess portion 38*b*. As described in detail below, therefore, the brush card cylindrical portion 51 does not close the hole portion 39 even when the brush card cylindrical portion 51 is fitted in the bracket inner side surface 31*j*. The cross-sectional shape of the hole portion 39 is not particularly limited, but may be a circular or substantially circular shape.

As shown in FIGS. 1, 3, and 4, the bracket flange portion 31*c* extends radially outward from an upper end of the bracket cylindrical portion 31*b*. The bracket flange portion 31*c* has an annular shape extending around in the circumferential direction.

As shown in FIGS. 1 and 3, the lower bearing holding portion 31*d* extends upwardly from the bracket bottom portion 31*a* at a radially inner side of the bracket cylindrical portion 31*b*. The lower bearing holding portion 31*d* holds the lower bearing 72. The lower bearing holding portion 31*d* has a cylindrical or substantially cylindrical shape enclosing the shaft 41 in the circumferential direction. The lower bearing holding portion 31*d* is arranged on a radially outer side than the output shaft hole 31*g*.

The oil seal holding portion 31*e* extends downwardly from the bracket bottom portion 31*a*. The oil seal holding portion 31*e* is arranged on a radially outer side than the output shaft hole 31*g*. The oil seal holding portion 31*e* has a cylindrical or substantially cylindrical shape enclosing the shaft 41 in the circumferential direction. The oil seal 73 is held inside the oil seal holding portion 31*e*.

As shown in FIG. 5, the ribs 35 are arranged on the upper surface of the bracket bottom portion 31*a*. In the embodiment, the number of ribs 35 is six. Each of the ribs 35 extends radially outward from the lower bearing holding portion 31*d*. The ribs 35 are arranged radially around the center axis J. Therefore, even if the bracket bottom portion 31*a* is thin, a certain level of strength can be ensured and the stiffness of the lower bearing holding portion 31*d* can be improved. This prevents the vibrations of the motor 10 from being transferred to the lower bearing holding portion 31*d*, the lower bearing 72, the shaft 41, and the commutator 44. As a result, the commutator 44 and the brush 54 stably contact each other, and this stable contact prevents sparking from occurring between the commutator 44 and the brush 54. As a result, the lifetime of the motor 10 can be prolonged.

A radially outer end of each rib 35 is connected to the bracket cylindrical portion 31*b*. In other words, the radially outer end of each rib 35 is connected to the step portion 31*h*. Therefore, the stiffness of the lower bearing holding portion 31*d* can be further improved. Preferably, the number of ribs 35 on the bracket 30 is not less than three.

The ribs 35 include the first ribs 35*a* and the second ribs 35*b*. Each of the first ribs 35*a* has a first portion 35*c* and a second portion 35*d*. Each of the second ribs 35*b* has a first portion 35*e* and a second portion 35*f*. A radially inner end of each first portion 35*c* is connected to the lower bearing holding portion 31*d*. A radially inner end of each first portion 35*e* is connected to the lower bearing holding portion 31*d*. In the radial direction, the positions of radially outer ends of the first portions 35*c*, 35*e* are the same as the positions of the radially outer ends of the first recess portions 38*a*.

Radially inner ends of the second portions 35*d*, 35*f* are respectively connected to the radially outer ends of the first portions 35*c*, 35*e*. Radially outer ends of the second portions 35*d*, 35*f* are respectively connected to the bracket cylindrical portion 31*b*. The second portions 35*d*, 35*f* are arranged on the radially outer ends of the ribs 35. The second portions 35*d*, 35*f* are arranged on a radially outer side than the first recess portions 38*a*. As shown in FIG. 3, upper ends of the second portions 35*d*, 35*f* are arranged below the first portions 35*c* in the axial direction.

As shown in FIGS. 3 and 5, upper ends Pb of the first portions 35*e* in the second ribs 35*b* are arranged below upper ends Pa of the first portions 35*c*. That is, the upper ends of the second ribs 35*b* are arranged below the first ribs 35*a* in the axial direction.

The bracket 30 can be molded by casting and cutting or the like. The bracket 30 can be manufactured in such a manner that a cast obtained by casting or the like is partially subjected to cutting or the like. In the cutting or the like, a jig is required for holding the cast. Portions of the cast, to be supported by the jig, each serve as a reference for the cutting or the like.

In the embodiment, the upper end of each rib 35 may be defined as the reference for the cutting or the like. Therefore, the process of manufacturing the bracket 30 can be partially simplified without an additional reference portion on the cast. If the upper end of each rib 35 is defined as the reference for the cutting or the like, preferably, the upper end of each rib 35 contacts the jig and the jig holds the cast.

At this time, preferably, the number of ribs 35 contacting the jig is three in order to allow the jig to stably hold the cast and to determine, for example, a reference for the jig in the cutting or the like. The number of ribs contacting the jig is not limited to three, but may be not less than four.

The ribs 35 include two kinds of ribs which are different from each other in the axial position of the upper end. The ribs 35 include the first ribs 35*a* and the second ribs 35*b*. In the embodiment, the six ribs 35 include the three first ribs 35*a* and the three second ribs 35*b*. In the axial direction, the positions of the upper ends of the first ribs 35*a* are higher than the positions of the upper ends of the second ribs 35*b*. Therefore, the three ribs, each having the highest axial position of the upper end, can be defined as a reference point contacting the jig. That is, the three first ribs 35*a* can be defined as a reference point contacting the jig. At this time, the upper ends of the remaining ribs (i.e., the second ribs 35*b*) are positioned below the first ribs 35*a* contacting the jig. Therefore, the second ribs 35*b* do not contact the jig.

Accordingly, the three first ribs 35*a* allow the jig to stably hold the cast and also allow a reference surface to be easily determined. The second ribs 35*b* which do not contact the jig are provided, so that the number of ribs 35 can be increased to more than three. Thus, the ribs 35 can easily determine an axial reference in working the cast by, for example, a worker. Since the number of ribs 35 is increased, the stiffness of the lower bearing holding portion 31*d* can be improved.

As described above, the cast can be subjected to the cutting or the like with ease and with high accuracy. Accordingly, the bracket 30 can be molded with high accuracy.

The mounting portion lower surface 31*i* is included in the portion of the cast to be subjected to the cutting or the like with the ribs 35 defined as a reference.

The ribs 35 are spaced apart from each other at an equal interval in the circumferential direction. In the embodiment, the first ribs 35*a* and the second ribs 35*b* are alternately arranged in the circumferential direction. That is, the first ribs 35*a* and the second ribs 35*b* are respectively spaced apart from each other at an equal interval in the circumferential direction. In the embodiment, the three first ribs 35*a* and the three second ribs 35*b* are arranged. The first ribs 35*a* and the second ribs 35*b* are respectively arranged in the circumferential direction so as to be spaced apart from each other by 120°. Thus, the first ribs 35*a* allow the jig to stably support the cast (i.e., the bracket 30). Accordingly, the bracket 30 can be manufactured with high accuracy.

As shown in FIGS. 3 and 4, the fixing wall portions 32, 33, 34 are arranged on a radially outer edge of the opening of the bracket cylindrical portion 31b. The fixing wall portions 32, 33, 34 extend more axially upward than the upper surface of the bracket flange portion 31c. The fixing wall portions 32, 33, 34 are spaced apart from one another in the circumferential direction. The fixing wall portion 32 and the fixing wall portion 33 are arranged on portions opposite to each other across the center axis J. The fixing wall portion 34 is arranged between the fixing wall portion 32 and the fixing wall portion 33 in the circumferential direction.

Each of the fixing wall portions 32, 33, 34 has at least one mounting hole portion 36. The mounting hole portions 36 axially pass through the fixing wall portions 32, 33, 34. In mounting the motor 10 on, for example, a vehicle body, a screw is penetrated through each mounting hole portion 36 and the mounting hole portion in the housing flange portion 22.

The fixing wall portions 32 and 33 have fixed hole portions 37 axially passing through the fixing wall portions 32 and 33. Preferably, an inner side surface of each fixed hole portion 37 has a thread groove. A screw 74 is pushed into each fixed hole portion 37 through the fixed hole portion of the housing flange portion 22. By this, the housing 20 can be fixed to the bracket 30.

As shown in FIG. 1, the brush card assembly 50 is arranged between the housing 20 and the bracket 30 in the axial direction.

Figure 6:
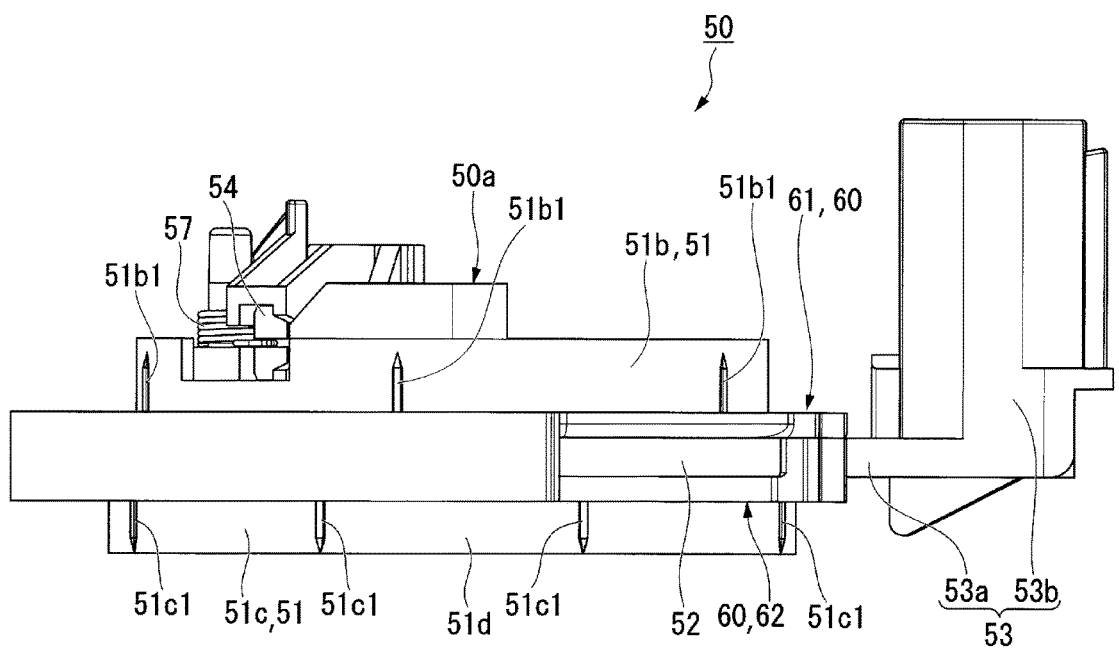
FIG. 6 is a side view showing a brush card assembly and a seal member according to the embodiment.

FIG. 6 is a side view showing the brush card assembly 50 and the seal member 60. As shown in FIGS. 1, 2 and 6, the brush card assembly 50 has the brush card 50a, the brush 54, a choke coil 55, a connection terminal 56, and a spring 57.

As shown in FIGS. 2 and 6, the brush card 50a has a brush card cylindrical portion 51, a brush card flange portion 52, and a connector part 53. The brush card 50a may be made of, for example, synthetic resin or the like. The brush card 50a holds the brush 54. The brush card 50a may be made of a material other than synthetic resin.

As shown in FIGS. 1 and 2, the brush card cylindrical portion 51 has a cylindrical or substantially cylindrical shape enclosing the shaft 41 in the circumferential direction. In the embodiment, the brush card cylindrical portion 51 has a cylindrical or substantially cylindrical shape which is concentric with the center axis J. The brush card cylindrical portion 51 has a circular portion 51a, an upper wall portion 51b, a lower wall portion 51c, a plurality of upper protrusions 51b1, and a plurality of lower protrusions 51c1.

The circular portion 51a has an annular shape enclosing the shaft 41. The circular portion 51a has a plate or substantially plate shape expanded in the radial direction. The circular portion 51a has the brush 54, the choke coil 55, the connection terminal 56, and a holding portion (not shown). The holding portion holds the spring 57 and the like. The upper wall portion 51b extends upwardly from a radially outer edge of the circular portion 51a.

As shown in FIG. 1, the upper wall portion 51b is fitted in the lower opening portion 21a. That is, the brush card cylindrical portion 51 is fitted in the housing 20. The brush card cylindrical portion 51 is fixed by, for example, press fitting or the like to the inner side surface of the housing 20.

As shown in FIG. 5, the lower wall portion 51c extends downwardly from the brush card flange portion 52. At least a portion of the lower wall portion 51c is arranged in the bracket cylindrical portion 31b. In other words, at least a portion of the brush card cylindrical portion 51 is arranged in the bracket cylindrical portion 31b. The lower wall portion 51c is fitted in the bracket cylindrical portion 31b. That is, the brush card cylindrical portion 51 is fitted in the bracket cylindrical portion 31b.

Therefore, the brush card 50a can be fixed to the bracket cylindrical portion 31b with high positional accuracy. The bracket 30 holds the lower bearing 72. Thus, the relative positional accuracy between the brush 54 and the commutator 44 can be made higher. Accordingly, the brush 54 can stably contact the commutator 44. As a result, the lifetime of the motor 10 can be further prolonged.

The brush card 50a is fitted in the bracket cylindrical portion 31b. Therefore, there is no necessity to additionally provide a portion to be fitted in the brush card 50a, on the radially inner side of the bracket cylindrical portion 31b. By this, the bracket 30 can be configured more simply, and the motor 10 can be downsized in the radial direction.

Each of the first ribs 35a has the first portion 35c and the second portion 35d. Each of the second ribs 35b has the first portion 35e and the second portion 35f. The axial positions of the upper ends of the second portions 35d, 35f are lower than the axial positions of the upper ends of the first portions 35c, 35e. Moreover, the second portions 35d, 35f are arranged on the radially outer ends of the first and second ribs 35a, 35b. Therefore, a clearance DP is defined above each of the second portions 35d, 35f between each of the first portions 35c, 35e and the bracket cylindrical portion 31b in the radial direction.

Each of the clearances DP allows the lower wall portion 51c to be inserted up to the depth of the bracket cylindrical portion 31b in fitting the lower wall portion 51c in the bracket cylindrical portion 31b. That is, the lower wall portion 51c can be inserted up to the bracket bottom portion 31a in fitting the lower wall portion 51c in the bracket cylindrical portion 31b.

The stiffness of the bracket 30 increases when the plurality of ribs are connected to the bracket cylindrical portion 31b or when the respective ribs extend more radially outward than the inner circumferential surface of the lower wall portion 51c. On the other hand, if the plurality of ribs are connected to the bracket cylindrical portion 31b or if the respective ribs extend more radially outward than the inner circumferential surface of the lower wall portion 51c, the lower wall portion 51c can be fitted up to only the upper end of each rib in the bracket cylindrical portion 31b. Therefore, a region, where the lower wall portion 51c is fitted in the bracket cylindrical portion 31b, is decreased in axial length. Accordingly, there is a necessity to increase the bracket cylindrical portion 31b in axial length for ensuring a predetermined region where the lower wall portion 51c is fitted in the bracket cylindrical portion 31b.

However, each clearance DP allows an increase in axial length of the region where the lower wall portion 51c is fitted in the bracket cylindrical portion 31b, without increasing the bracket cylindrical portion 31b in axial length. Therefore, the brush card 50a can be fixed to the bracket 30 more tightly. Thus, the brush card 50a can be fixed to the bracket 30 with high positional accuracy. As a result, the brush 54 and the commutator 44 stably contact each other, and the lifetime of the motor 10 can be further prolonged. Since the brush card cylindrical portion 51 can be inserted up to the depth of the bracket cylindrical portion 31b, the motor 10 can be downsized in the axial direction.

The lower end of the lower wall portion 51c is positioned below the upper ends of the first portions 35c. A portion of the lower end of the lower wall portion 51c is positioned at the clearance DP.

The brush card cylindrical portion 51 is fixed by press fitting or the like to the bracket inner side surface 31j.

Therefore, the brush card 50a can be fixed to the bracket 30 more tightly. The brush 54 can contact the commutator 44 more stably. Accordingly, the lifetime of the motor 10 can be further prolonged.

Preferably, the bracket inner side surface 31j is subjected to cutting or the like. Therefore, the dimensional accuracy of the bracket inner side surface 31j can be improved. By this, the brush card cylindrical portion 51 is fitted in the bracket inner side surface 31j with high accuracy, so that the brush card 50a can be fixed to the bracket 30 with high accuracy. As a result, the brush 54 and the commutator 44 can contact each other more stably, and the lifetime of the motor 10 can be further prolonged.

As shown in FIG. 2, the upper protrusions 51b1 protrude radially outward from an outer circumferential surface of the upper wall portion 51b. The brush card cylindrical portion 51 has, on its outer side surface, the plurality of upper protrusions 51b1 protruding radially outward. The upper protrusions 51b1 are spaced apart from each other at a predetermined interval in the circumferential direction. Preferably, the upper protrusions 51b1 extend in the axial direction.

The upper protrusions 51b1 contact the inner side surface of the housing 20. Therefore, the upper protrusions 51b1 become deformed when the brush card cylindrical portion 51 is fixed by, for example, press fitting or the like to the inner side surface of the housing 20. As a result, a stress to be applied between each upper protrusion 51b1 and the inner side surface of the housing 20 can be improved. Therefore, the brush card 50a can be fixed to the housing 20 more tightly.

As shown in FIG. 6, the lower protrusions 51c1 protrude radially outward from an outer circumferential surface 51d of the lower wall portion 51c. The brush card cylindrical portion 51 has, on its outer side surface, the plurality of lower protrusions 51c1 protruding radially outward. The lower protrusions 51c1 are spaced apart from each other at a predetermined interval in the circumferential direction. Preferably, the lower protrusions 51c1 extend in the axial direction.

As shown in FIG. 5, the lower protrusions 51c1 contact the bracket inner side surface 31j. Therefore, the lower protrusions 51c1 become deformed when the brush card cylindrical portion 51 is fixed by, for example, press fitting or the like to the bracket inner side surface 31j. As a result, a stress to be applied between each lower protrusion 51c1 and the bracket inner side surface 31j can be improved. By this, the brush card 50a can be fixed to the bracket 30 more tightly. Accordingly, the brush 54 can stably contact the commutator 44. As a result, the lifetime of the motor 10 can be further prolonged.

As shown in FIGS. 1 and 2, the brush card flange portion 52 has an annular shape. The brush card flange portion 52 extends radially outward from the upper wall portion 51b. Moreover, the brush card flange portion 52 encloses the upper wall portion 51b in the circumferential direction at a predetermined radial width. That is, the brush card flange portion 52 extends radially from the brush card cylindrical portion 51. The brush card flange portion 52 extends more radially outward than the housing cylindrical portion 21. The brush card flange portion 52 is arranged between the housing flange portion 22 and the bracket flange portion 31c in the axial direction.

As shown in FIG. 2, the connector part 53 protrudes radially outward from the brush card flange portion 52. The connector part 53 has a connector connecting portion 53a and a connector cylindrical portion 53b. The connector connecting portion 53a connects between the brush card flange portion 52 and the connector cylindrical portion 53b. As shown in FIGS. 2 and 6, the top surface of the brush card flange portion 52 and the top surface of the connector connecting portion 53a are connected to each other on the same plane. The bottom surface of the brush card flange portion 52 and the bottom surface of the connector connecting portion 53a are connected to each other on the same plane.

As shown in FIG. 1, the connector cylindrical portion 53b has a cylindrical or substantially cylindrical shape which extends upwardly from a radially outer end of the connector connecting portion 53a. The connector cylindrical portion 53b has a connector opening 53c which is open at an upper portion thereof. The connector cylindrical portion 53b is exposed outside the housing 20 and the bracket 30. The connector cylindrical portion 53b is connected to an external power supply (not shown).

As shown in FIG. 2, a box-shaped accommodating portion is arranged on the top surface of the circular portion 51a. The brush 54 is arranged inside the accommodating portion of the circular portion 51a. The spring 57 (see FIG. 1) presses a radially outer end of the brush 54 radially inward. As shown in FIG. 1, when an elastic force is applied to the radially inner end of the brush 54 by the spring 57, the radially inner end of the brush 54 contacts the commutator 44. In actuating the motor 10, preferably, the commutator 44 rotates while contacting the brushes 54. In FIG. 2, the brush card assembly 50 has two brushes 54. The number of brushes 54 is not limited to two, but may be appropriately changed.

The choke coil 55 is arranged on the top surface of the circular portion 51a. One end of the choke coil 55 is electrically connected to the brush 54. The other end of the choke coil 55 is electrically connected to the connection terminal 56 (see FIG. 1).

As shown in FIG. 1, the connection terminal 56 is held at the brush card 50a. The connection terminal 56 protrudes upwardly from the bottom portion of the connector opening 53c. The connection terminal 56 is electrically connected to an external power supply (not shown) connected to the connector part 53. By this, a current is supplied to the commutator 44 from the external power supply through the connection terminal 56, the choke coil 55, and the brush 54. When being supplied with a current from the commutator 44, the armature 40 is excited. By this, a rotor including the armature 40 rotates by a magnetic interaction between the armature 40 and the magnet 70.

The seal member 60 is disposed between the housing 20 and the bracket 30 in the axial direction. Preferably, the seal member 60 is made of an elastic material such as rubber or the like. Preferably, the seal member 60 is made of, for example, a thermosetting elastomer, a thermoplastic elastomer or the like. As shown in FIG. 2, the seal member 60 has an upper seal portion 61 and a lower seal portion 62. Each of the upper seal portion 61 and the lower seal portion 62 has an annular shape enclosing the shaft 41 in the circumferential direction.

As shown in FIG. 1, the upper seal portion 61 is arranged between the brush card flange portion 52 and the housing flange portion 22 in the axial direction. The lower seal portion 62 is arranged between the brush card flange portion 52 and the bracket flange portion 31c in the axial direction. By this, it is possible to improve waterproof property of the motor 10.

The present disclosure is not limited to the embodiments described above, but may employ other configurations. In the following description, the same components as the description are properly denoted by the same reference numerals, and therefore the description thereof may be omitted.

The brush card cylindrical portion 51 may be fitted in a portion other than the bracket cylindrical portion 31b. In the bracket 30, for example, a portion, in which the brush card cylindrical portion 51 is fitted, may be provided on a radially inner side than the bracket cylindrical portion 31b.

The brush card cylindrical portion 51 is not necessarily fitted in the bracket 30. Also in this case, the brush card 50a can contact the bracket 30, so that the position of the brush card 50a relative to the bracket 30 can be fixed. Therefore, the brush 54 can stably contact the commutator 44, and the lifetime of the motor 10 can be prolonged. The brush card 50a does not necessarily contact the bracket 30.

The brush card cylindrical portion 51 does not necessary have one of or both the upper protrusions 51b1 and the lower protrusions 51c1.

The ribs 35 are not necessarily connected to the step portion 31h. The ribs 35 may be connected to a portion other than the step portion 31h or are not necessarily connected to the bracket cylindrical portion 31b.

If the ribs 35 are not connected to the bracket cylindrical portion 31b, the radially outer ends of the ribs 35 are arranged on a radially inner side than the bracket cylindrical portion 31b. A clearance is defined between each rib 35 and the inner surface of the bracket cylindrical portion 31b in the radial direction. Therefore, the lower wall portion 51c can be inserted up to the depth of the bracket cylindrical portion 31b, and the brush card 50a can be fixed to the bracket 30 more tightly. Accordingly, the brush 54 can stably contact the commutator 44, and the lifetime of the motor 10 can be further prolonged.

The number of first ribs 35a may be equal to or different from the number of second ribs 35b.

The plurality of ribs 35 may include three or more kinds of ribs which are different from each other in the axial position of the upper end. The axial positions of the upper ends of all the ribs 35 may be the same as one another. The plurality of ribs 35 may include two or more kinds of ribs which are different from one another in a shape except that they are different from one another in the axial position of the upper end.

With regard to each of the first ribs 35a, as long as the axial position of the upper end is lower than the radially outer end, the configurations of the first portion 35c and second portion 35d are not particularly limited. For example, each of the first ribs 35a may be formed into such a shape that the position of the upper end is gradually positioned at the lower side from the radially inner side to the radially outer side. In this case, the second portion corresponds to the portion positioned at the radially outer end, and the first portion corresponds to the portion positioned on a radially inner side than the second portion. This is similarly applied to the second ribs 35b.

In the first ribs 35a, the axial positions of the upper ends may be the same as one another in the radial direction or may be arranged upwardly toward the radially outer side. This is similarly applied to the second ribs 35b. In the first ribs 35a, the upper ends may be a curved surface or an inclined surface relative to the center axis J. In the second ribs 35b, the upper ends may be a curved surface or an inclined surface relative to the center axis J.

The lower wall portion 51c may have a brush card recess portion recessed upwardly from the lower end. In this case, the ribs 35 may be arranged inside the brush card recess portion. Thus, the lower wall portion 51c can be inserted up to the depth of the bracket cylindrical portion 31b even if each rib 35 has no second portion having the upper end positioned downward. Therefore, the brush card 50a can be fixed to the bracket 30 more tightly, and the brush 54 can stably contact the commutator 44. Accordingly, the lifetime of the motor 10 can be prolonged.

The entire inner side surface of the bracket cylindrical portion 31b may be a surface subjected to cutting or the like. The bracket cylindrical portion 31b does not necessarily have the bracket inner side surface 31j subjected to cutting.

At least one of each first recess portion 38a and the second recess portion 38b is not necessarily arranged between the ribs 35 in the circumferential direction. A portion of each first recess portion 38a or a portion of the second recess portion 38b is not necessarily arranged between the ribs 35 in the circumferential direction. At least a portion of each recess portion 38 may be arranged between the ribs 35 in the circumferential direction.

The hole portion 39 may be arranged at a portion other than bracket cylindrical portion 31b. The hole portion 39 may be arranged in the bracket bottom portion 31a. The hole portion 39 is not necessarily provided.

Features of the above-described embodiments and the modifications thereof may be combined appropriately as long as no conflict arises.

While embodiments of the present invention have been described above, it is to be understood that variations and modifications will be apparent to those skilled in the art without departing from the scope and spirit of the present invention. The scope of the present invention, therefore, is to be determined solely by the following claims.

While embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A motor including a shaft extending in a direction parallel with a center axis extending in a vertical direction, comprising:
   an armature fixed to the shaft;
   a commutator fixed to the shaft and electrically connected to the armature;
   a bearing supporting the shaft;
   a cylindrical housing being open toward a lower side and accommodating the armature;
   a cylindrical bracket positioned under the housing and fixed to the housing; and
   a brush card assembly positioned between the housing and the bracket in an axial direction,
   wherein the brush card assembly comprises:
   a brush contacting the commutator, and
   a brush card holding the brush, and the bracket comprises:
- a bracket bottom portion covering at least a portion of a lower side of the brush card,
- a bracket cylindrical portion extending upwardly from a radially outer edge of the bracket bottom portion,
- a bearing holding portion extending upwardly from the bracket bottom portion at a radially inner side of the bracket cylindrical portion, and holding the bearing, and
- a rib positioned above the bracket bottom portion, and extending radially outward from the bearing holding portion.

2. The motor according to claim 1,
wherein the brush card comprises a brush card cylindrical portion enclosing the shaft in a circumferential direction,
at least a portion of the brush card cylindrical portion is arranged inside the bracket cylindrical portion, and
the brush card cylindrical portion is fitted in the bracket cylindrical portion.

3. The motor according to claim 2,
wherein the brush card cylindrical portion is fixed by press fitting to an inner side surface of the bracket cylindrical portion.

4. The motor according to claim 3,
wherein an outer side surface of the brush card cylindrical portion has a protrusion protruding outwardly in a radial direction, and
the protrusion contacts the inner side surface of the bracket cylindrical portion.

5. The motor according to claim 4,
wherein the bracket cylindrical portion has an inner side surface subjected to cutting.

6. The motor according to claim 1,
wherein the rib has a radially outer end connected to the bracket cylindrical portion.

7. The motor according to claim 6,
wherein the rib comprises
- a first portion, and
- a second portion having an upper end which is arranged below the first portion in the axial direction, and
the second portion is positioned at a radially outer end of the rib.

8. The motor according to claim 1,
wherein the rib of the bracket includes a plurality of ribs, and
the plurality of ribs include
- a first rib and
- a second rib having an upper end arranged below the first rib in the axial direction.

9. The motor according to claim 8,
wherein the number of ribs of the bracket is not less than four,
three of the ribs each correspond to the first rib, and
the remaining rib or ribs each have the upper end arranged below the first ribs in the axial direction.

10. The motor according to claim 1,
wherein the bracket comprises a mounting portion protruding downwardly from a lower surface of the bracket bottom portion,
the bracket bottom portion comprises a recess portion provided on an upper surface of the bracket bottom portion and recessed downwardly, and
at least a portion of the recess portion overlaps with the mounting portion in the axial direction.

11. The motor according to claim 1,
wherein the rib of the bracket includes a plurality of ribs,
the bracket bottom portion comprises a recess portion provided on an upper surface of the bracket bottom portion and recessed downwardly, and
at least a portion of the recess portion is arranged between the ribs in a circumferential direction.

12. The motor according to claim 10,
wherein the bracket cylindrical portion comprises a hole portion being open at the recess portion, and
the hole portion has an opening at an inner side surface of the bracket cylindrical portion and an opening at an outer side surface of the bracket cylindrical portion.

* * * * *